US012142962B2

(12) United States Patent
Ball

(10) Patent No.: US 12,142,962 B2
(45) Date of Patent: *Nov. 12, 2024

(54) ELECTROMAGNETIC AND SOLAR POWER SYSTEM AND METHOD

(71) Applicant: Heathe W. Ball, Grain Valley, MO (US)

(72) Inventor: Heathe W. Ball, Grain Valley, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/222,653

(22) Filed: Jul. 17, 2023

(65) Prior Publication Data

US 2023/0369884 A1   Nov. 16, 2023

Related U.S. Application Data

(63) Continuation of application No. 17/549,198, filed on Dec. 13, 2021, now Pat. No. 11,715,970.

(60) Provisional application No. 63/125,216, filed on Dec. 14, 2020.

(51) Int. Cl.
*H02J 7/35* (2006.01)
*H02J 7/00* (2006.01)
*H02J 50/00* (2016.01)

(52) U.S. Cl.
CPC .............. *H02J 7/35* (2013.01); *H02J 7/0068* (2013.01); *H02J 50/00* (2016.02)

(58) Field of Classification Search
CPC .. H02J 7/35; H02J 50/00; H02J 7/0068; H02J 7/00
See application file for complete search history.

(56) References Cited

U.S. PATENT DOCUMENTS 11,715,970 B2 * 8/2023 Ball .................. H02J 50/00
307/19
2022/0190630 A1 6/2022 Sherman et al.

* cited by examiner

*Primary Examiner* — Robert L Deberadinis
(74) *Attorney, Agent, or Firm* — Law Office of Mark Brown, LLC; Christopher M DeBacker

(57) ABSTRACT

A long-duration power system configured for powering an electric load without the need for direct, wired connection to an outside power supply. The power system comprises a combination electromagnetic and solar power system. The system includes a rechargeable battery, photovoltaic modules, an electromagnetic (EM) receiver, an EM transmitter, and a power/battery management system. Primary electrical power is provided by the photovoltaic cells within the photovoltaic modules when the system is in light. Directed energy from the remote EM transmitter is configured to be aimed at the EM receiver, as needed, to augment the electricity produced by the photoelectric cells. The power/battery management system monitors the power system to ensure that the battery and the electric loads do not operate outside their safe limits. The power system may further include limit switches to prevent the power system from operating outside of safe limits.

20 Claims, 2 Drawing Sheets

ELECTROMAGNETIC AND SOLAR POWER SYSTEM AND METHOD

CROSS-REFERENCE TO RELATED APPLICATION

This application is a continuation of U.S. patent application Ser. No. 17/549,198, filed Dec. 13, 2021, which claims priority in U.S. Provisional Patent Application No. 63/125,216 filed Dec. 14, 2020, which is incorporated herein by reference.

BACKGROUND OF THE INVENTION

1. Field of the Invention

The present invention relates generally to power systems and methods for use thereof, and more specifically to a combination solar and remote electromagnetic power system and method of use.

2. Description of the Related Art

Power systems for powering electric loads are essential to many different industries for countless different uses. Efficiency of power systems is extremely important as greater efficiency ultimately leads to lesser fuel consumption and/or lesser amounts of other power sources expended. Additionally, integration of renewable energy components into power systems can help to cut down on carbon emissions.

Moreover, power systems for powering electric loads on mobile vehicles or other mobile objects present added challenges. Use of such powered mobile vehicles or objects is limited by the amount of time the vehicle or object can be powered or operated without having to recharge or replace its battery and/or to refuel. Accordingly, efficiency in remote power systems for mobile vehicles or objects is a key component in the usefulness of the vehicle or object for a particular task.

Photovoltaic modules, commonly known as solar panels, which are made up of a plurality of photovoltaic cells, are commonly used in power systems as a renewable energy source which convert light energy from the Sun into electric power. However, the electric power produced by photovoltaic modules is limited by the amount of sunlight on a given day, and no electric power is produced by photovoltaic modules at night. The number of available photovoltaic cells can also limit power production, and space may be limited at the site of mobile objects.

What is needed is an efficient combination solar and remote power system for mobile electric loads. Heretofore there has not been available an electromagnetic and solar power system and method with the advantages and features of the present invention.

SUMMARY OF THE INVENTION

The present invention provides a long-duration power system configured for powering an electric load without the need for direct, wired connection to an outside power supply. In an aspect of the present invention, the power system comprises a combination electromagnetic and solar power system. In an embodiment, the power system includes a rechargeable battery, photovoltaic modules, an electromagnetic (EM) receiver, an EM transmitter, and a power/battery management system. The present invention may further optionally include a connection for external power supply. If equipped with a connection for external power supply, the battery can be fully charged from an external power source whenever convenient.

Primary electrical power is generated by the photovoltaic cells within the photovoltaic modules when the system is in light. Additionally, the present system is further configured to receive EM waves transmitted from a remote EM transmitter, which the system converts to electric power. Directed energy from the remote EM transmitter is configured to be aimed at the EM receiver, as needed, to augment the electricity produced by the photoelectric cells. Iterations of the present invention could exist where the transmission of energy via the EM transmitter is the primary power source with the photovoltaic cells augmenting that source as available. Power converted from the photovoltaic cells and from EM waves received is stored in the system battery until used to power an electric load. The power/battery management system monitors the power system to ensure that the battery and the electric loads do not operate outside their safe limits. The power system may further include limit switches to prevent the power system from operating outside of safe limits. The power system may further include a photovoltaic solar panel for generating power to be transmitted via the EM transmitter to the electric load.

BRIEF DESCRIPTION OF THE DRAWINGS

The drawings constitute a part of this specification and include exemplary embodiments of the present invention illustrating various objects and features thereof.

DETAILED DESCRIPTION OF THE PREFERRED EMBODIMENTS

I. Introduction and Environment

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Additionally, anatomical terms are given their usual meanings. For example, proximal means closer to the trunk of the body, and distal means further from the trunk of the body. Said terminology will include the words specifically mentioned, derivatives thereof and words of similar meaning.

II. Preferred Embodiment Electromagnetic (EM) and Solar Power System 2

Figure 1:
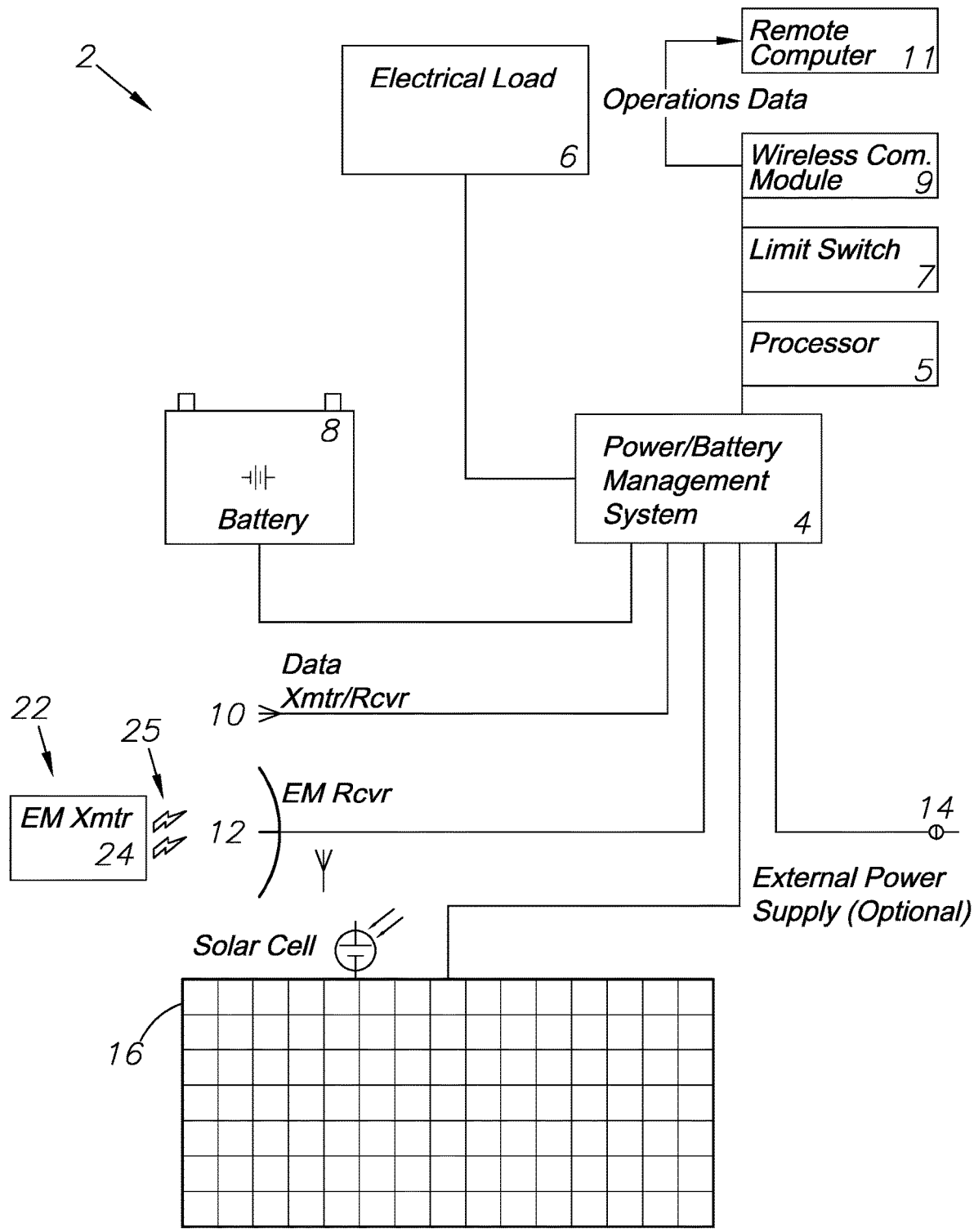
FIG. 1 shows a schematic diagram of a power system embodying the present invention.

As shown in FIG. 1, the present invention discloses a combination solar and electromagnetic (EM), long-duration power system 2 configured for powering an electric load 6 without requiring direct, wired connection to an outside power supply 14 and method of use thereof. In a preferred embodiment, the power system 2 is configured for powering an electric load 6 on a mobile, motive, or remote vehicle or object. Such powered mobile or motive vehicles or objects include, but are not limited to, unmanned aerial vehicles (UAVs), drones, ships, boats, land vehicles, construction equipment, satellites, space probes, and space stations.

In an exemplary embodiment, the power system 2 of the present invention includes a rechargeable battery 8, photovoltaic modules 16, an EM receiver 12, an EM transmitter 24 connected to a remote EM transmitter subsystem 22, and a power/battery management system 4. The present invention may further optionally include a connection for external power supply 14. In embodiments equipped with connection(s) for external power supply, the system rechargeable battery 8 can be fully charged from an external power source, such as a power outlet, when convenient.

The battery 8 of the present invention may be one or more lead-acid, nickel-cadmium (NiCd), nickel-metal hydride (NiMH), lithium-ion (Li-ion), lithium iron phosphate (LiFePO4), lithium-ion polymer (LiPo), zinc-air, rechargeable alkaline, or any other type of rechargeable battery. The power system of the present invention may include any number of photovoltaic modules 16, each being made up of any number of photovoltaic cells. The photovoltaic modules are connected to the battery 8 and are configured for converting light energy into electric power, which is stored by the battery until used to power an electric load.

The EM receiver 12 of the present invention is connected to the battery 8 and configured for receiving EM waves 25 from a remote EM transmitter subsystem 22 which includes the EM transmitter 24. The system is configured for converting received EM waves 25 into electric power, which is stored by the battery 8 until used to power an electric load 6. The types and frequencies of EM waves transmitted to and received by the system can vary in different embodiments of the present invention. Embodiments include, but are not limited to, transferred and received microwaves, radio waves, and laser light waves. In some embodiments utilizing transferred energy via laser waves, the photovoltaic modules may further serve as the EM receiver. Similarly, the maximum transmission distance of the power system EM waves varies in different embodiments, which is largely dependent on the type of EM energy transmitted. In preferred embodiments, maximum transmission distance of EM waves spans more than thousands of miles.

Figure 2:
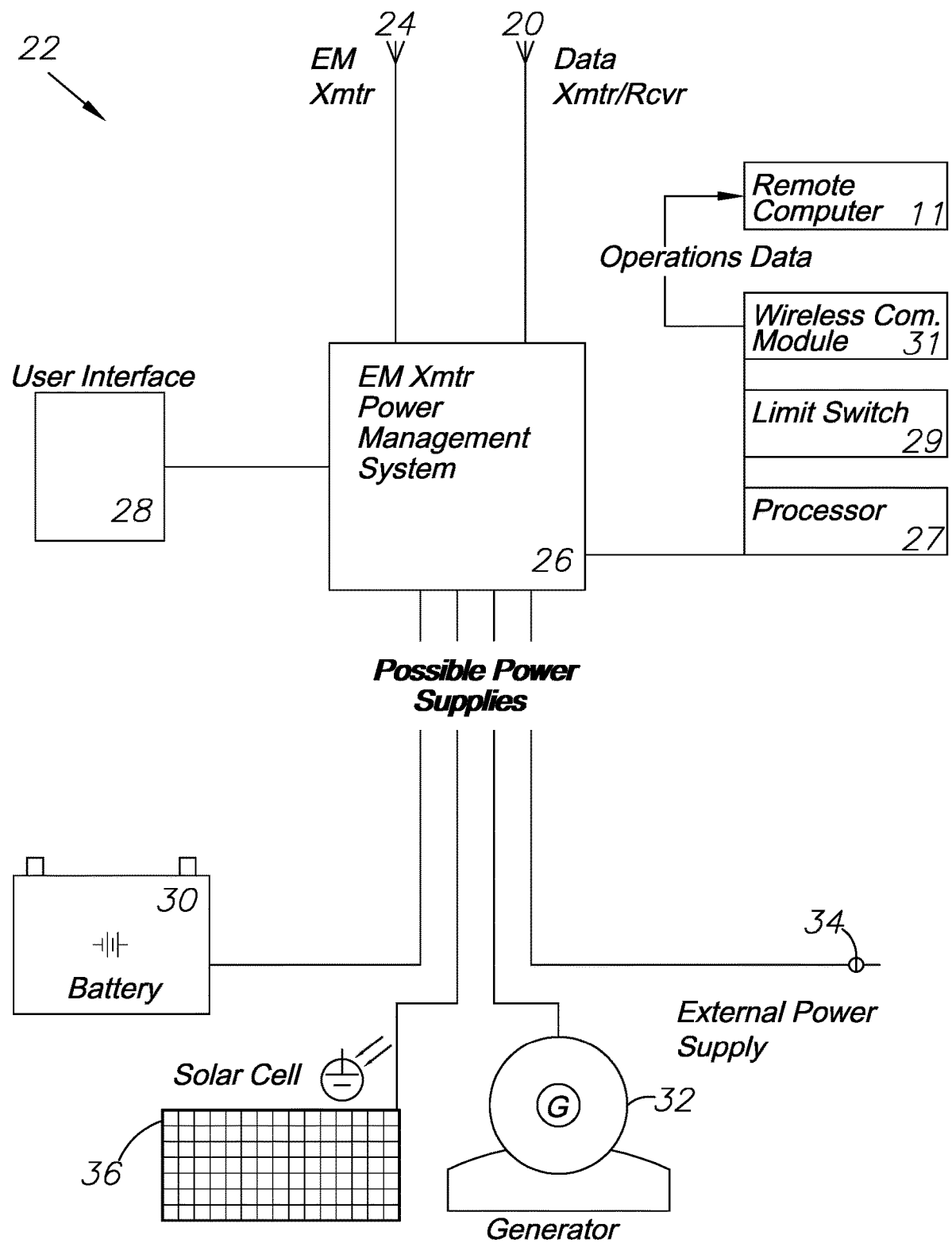
FIG. 2 shows a schematic diagram of an electromagnetic (EM) transmitter of the power system of FIG. 1.

The EM transmitter 24 of the present invention may transmit one fixed frequency of EM waves 25 or may be configured for transmitting EM waves within a small range of frequencies within the same type of electromagnetic energy. As shown in FIG. 2, embodiments of the EM transmitter subsystem 22 include the transmitter 24 being positioned in a fixed location and wired into an external power grid or a mobile transmitter having its own battery(ies) 30 and/or connected to a generator 32 or some other external power source 34. The battery 30 may be rechargeable and the external power sources 34 can provide the power necessary to recharge the battery. Photovoltaic cells 36 could also be connected to the EM transmitter subsystem 22 to provide power for the EM transmitter 34 to deliver as well. Preferably, the EM transmitter further includes a user interface 28 with a display configured for providing information to a user regarding transmission of EM waves to the power system EM receiver. The transmitter may also include user-operable controls via the user interface, which may further include physical and/or virtual buttons for operating various features of the transmitter. In an exemplary embodiment, the EM transmitter 24 is configured for pairing with the EM receiver 12. The transmitter 24 is aimed toward the receiver 12 to transfer EM waves and is configured for tracking the receiver. In an exemplary embodiment, the EM waves transmitted from the EM transmitter to the EM receiver are modulated and configured for transferring control and telemetry data to the power system EM receiver. Alternatively, a separate EM signal can be dedicated for transmitting control and telemetry data from the EM transmitter to the EM receiver via the data transmitter/receivers 10, 20, based on input via the user interface 28.

The EM transmitter subsystem 22 could function as a primary transmitter subsystem which can deliver power to one or more secondary transmitter subsystems (not shown), which may include the same structure and function as the EM transmitter subsystem 22 shown in FIG. 2. These secondary transmitter subsystems could then deliver power to one or EM receivers 12 of one or more combination solar and electromagnetic (EM), long-duration power systems 2. One example would be where the primary transmitter subsystem 22 transmits power to the secondary transmitter subsystem, such as a satellite, which then re-transmits the EM power to a remotely located primary receiver 12 of a combination solar and electromagnetic (EM), long-duration power system 2.

The power/battery management subsystem 4 of the power system 2 includes a processor 5 programmed for controlling the storage in and use of electric power from the rechargeable battery 8, photovoltaic cells 16, and EM receiver 12 to power electric load(s), as desired. Preferably, the power/battery management subsystem 4 further monitors power system battery and electric loads with the processor 5 to keep them operating within safe operating limits. These limits may be pre-defined or determined by the processor 5 based upon historical data and operating history. The power and battery management subsystem 4 may further include limit switches 7 to prevent the power system 2 from operating outside of safe limits. Other similar devices can be used in place of switches to monitor and adjust the power delivery. In an exemplary embodiment, the power/battery management subsystem 4 further includes a wireless communications module 9 configured for transmitting communications to a remote computing device 11, though it should be noted that the remote computing device 11 could be incorporated directly into the power/battery management subsystem. Such communications may include operations data such as, power system energy level, charge rate, alerts, and warnings, or other related data and information. Alternatively, or in addition to communications transmitted to a remote computing device, the EM transmitter 22 of the present invention may be equipped with a wireless communications receiver 20 configured for receiving communications transmitted from the power/battery management system. A similar power monitoring subsystem may be provided as an EM transmitter power management subsystem 26 with similar safety elements including a processor 27, limit switches 29, and wireless communications module 31 for communicating with the same remote computing device 11 or a different remote computing device.

In use of the present invention, primary electrical power is provided by the photovoltaic cells 16 within the photovoltaic modules when the system 2 is in light. The present power system is further supplemented by receiving EM waves 25 transmitted from the remote EM transmitter system 22, which the system converts to electric power. Alternatively, there could be instances where the transmission of energy via EM is the primary power source and the photovoltaic cells 16 provide augmented power when available. Directed energy from the remote EM transmitter 24 is configured to be aimed at the EM receiver 12, as needed, to augment the electricity produced by the photoelectric cells 16. Power converted from the photovoltaic cells and from EM waves received is stored in the system battery 8 until used to power an electric load 6. The power/battery management subsystem 4 monitors the power system to ensure that the battery and the electric loads 6 do not operate outside their safe limits.

It is to be understood that while certain embodiments and/or aspects of the invention have been shown and described, the invention is not limited thereto and encompasses various other embodiments and aspects.

Having thus described the invention, what is claimed as new and desired to be secured by Letters Patent is:

1. A power system for an object, the power system comprising:
    an electromagnetic (EM) receiver configured to receive EM waves from a remotely located EM transmitter subsystem having an EM transmitter, wherein said EM transmitter and said EM receiver are at least ten feet apart;
    a rechargeable battery connected to said EM receiver and to at least one power source, said rechargeable battery configured to receive electrical charge from said at least one power source and from said EM receiver;
    said at least one powered source comprising a photovoltaic module including at least one photovoltaic cell, said photovoltaic module located in a motive objected remotely located from said EM receiver and said EM transmitter;
    a power load associated with the motive object configured to be provided by said rechargeable battery, photovoltaic module, and said EM receiver; and
    a battery and power management subsystem configured to monitor said power load and further configured to alter said power load based upon power source, available power, efficiency parameters, and predefined safety parameters.

2. The power system of claim 1, further comprising:
    a personal computing device having a processor and data storage, said personal computing device communicatively connected with said battery and power management subsystem via a wireless communications module; and
    said personal computing device configured to control power storage and use of electric power from said rechargeable battery to said power load.

3. The power system of claim 1, further comprising at least one limit switch configured to prevent the power system from operating outside of predetermined safety limits.

4. The power system of claim 1, further comprising:
    said battery and power management subsystem comprising a processor configured to monitor said power load; and
    said processor further configured to automatically activate and deactivate said battery from providing said power load based upon said power source, available power, efficiency, and safety parameters.

5. The power system of claim 1, further comprising:
    said EM transmitter subsystem comprising an EM transmitter power management subsystem, a power source, and an EM transmitter;
    said EM transmitter configured to deliver EM waves to said EM receiver, thereby providing power to said power load and said rechargeable battery.

6. The power system of claim 5, further comprising:
    said EM transmitter subsystem comprising a user interface having a display; and
    said user interface configured to provide visual information regarding transmission of EM waves from said EM transmitter to said EM receiver.

7. The power system of claim 5, wherein said EM transmitter subsystem is remotely located in relation to said EM receiver.

8. The power system of claim 5, further comprising:
    a personal computing device having a processor and data storage, said personal computing device communicatively connected with said EM transmitter power management subsystem via a wireless communications module; and
    said personal computing device configured to control power storage and use of electric power from said EM transmitter to said EM receiver.

9. The power system of claim 5, further comprising at least one limit switch configured to prevent the EM transmitter power management subsystem from operating outside of predetermined safety limits.

10. The power system of claim 5, wherein said power source is a power source selected from the list comprising: photovoltaic solar cells; a generator; a battery; and a connected power grid.

11. The power system of claim 1, further comprising:
    a secondary EM transmitter and receiver unit configured to receive EM power from said EM transmitter; and
    said secondary EM transmitter and receiver unit further configured to relay said EM power from said EM transmitter to said EM receiver of the object; and
    thereby providing EM power to said power load.

12. The power system of claim 11, further comprising:
    the secondary EM transmitter and receiver unit having a trajectory through space;
    said trajectory being relayed to said EM transmitter; and
    said EM transmitter configured to track said secondary EM transmitter and receiver unit via said trajectory to ensure regular power delivery from said EM transmitter to said EM receiver.

13. The system of claim 1, further comprising:
    the object having a trajectory through space;
    said trajectory being relayed to said EM transmitter; and
    said EM transmitter configured to track said object via said trajectory to ensure regular power delivery from said EM transmitter to said EM receiver.

14. A power system for an object, the power system comprising:
    an electromagnetic (EM) receiver configured to receive EM waves from a remotely located EM transmitter subsystem having an EM transmitter, wherein said EM transmitter and said EM receiver are at least ten feet apart and wherein said EM receiver is associated with a motive object;
    a rechargeable battery connected to said EM receiver and to at least one power source, said rechargeable battery configured to receive electrical charge from said at least one power source and from said EM receiver;
    a power load associated with the motive object configured to be provided by said rechargeable battery, photovoltaic module, and said EM receiver; and
    a battery and power management subsystem configured to monitor said power load and further configured to alter said power load based upon power source, available power, efficiency parameters, and predefined safety parameters.

15. The power system of claim 1, further comprising:
a personal computing device having a processor and data storage, said personal computing device communicatively connected with said battery and power management subsystem via a wireless communications module; and
said personal computing device configured to control power storage and use of electric power from said rechargeable battery to said power load.

16. The power system of claim 1, further comprising at least one limit switch configured to prevent the power system from operating outside of predetermined safety limits.

17. The power system of claim 1, further comprising:
said battery and power management subsystem comprising a processor configured to monitor said power load; and said processor further configured to automatically activate and deactivate said battery from providing said power load based upon said power source, available power, efficiency, and safety parameters.

18. The power system of claim 1, further comprising:
said EM transmitter subsystem comprising an EM transmitter power management subsystem, a power source, and an EM transmitter;
said EM transmitter configured to deliver EM waves to said EM receiver, thereby providing power to said power load and said rechargeable battery.

19. The power system of claim 5, further comprising:
said EM transmitter subsystem comprising a user interface having a display; and
said user interface configured to provide visual information regarding transmission of EM waves from said EM transmitter to said EM receiver.

20. The power system of claim 5, wherein said EM transmitter subsystem is remotely located in relation to said EM receiver.

* * * * *